United States Patent
Gadepalli et al.

(10) Patent No.: US 9,781,247 B1
(45) Date of Patent: Oct. 3, 2017

(54) PROXIMITY ALERT AND PERSONALIZED INSTRUCTIONS RESPONSIVE TO A PHYSICAL DISTRESS

(71) Applicant: International Business Machines Corporation, Armonk, NY (US)

(72) Inventors: Venkata V. Gadepalli, Apex, NC (US); Trudy L. Hewitt, Cary, NC (US); Ashok K. Iyengar, Encinitas, CA (US); James M. Moreno, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/181,583

(22) Filed: Jun. 14, 2016

(51) Int. Cl.
- *H04M 1/725* (2006.01)
- *H04L 12/58* (2006.01)
- *H04W 4/02* (2009.01)

(52) U.S. Cl.
CPC ...... *H04M 1/72538* (2013.01); *H04L 51/046* (2013.01); *H04M 1/72569* (2013.01); *H04M 1/72572* (2013.01); *H04W 4/023* (2013.01)

(58) Field of Classification Search
CPC ......... H04M 1/72538; H04M 1/72572; H04M 1/72569; H04L 51/046; H04W 4/023
See application file for complete search history.

(56) References Cited

U.S. PATENT DOCUMENTS

| | | | |
|---|---|---|---|
| 6,882,837 B2 | 4/2005 | Fernandez et al. | |
| 8,380,162 B2 | 2/2013 | Matsuo et al. | |
| 8,478,229 B2 | 7/2013 | Velusamy et al. | |
| 8,907,782 B2 | 12/2014 | Baker et al. | |
| 2008/0243547 A1 | 10/2008 | Brett et al. | |
| 2011/0071880 A1* | 3/2011 | Spector | H04W 4/22 340/573.1 |
| 2014/0338445 A1* | 11/2014 | Lin | G01P 15/0891 73/382 R |
| 2015/0050888 A1 | 2/2015 | Baker et al. | |
| 2015/0230072 A1 | 8/2015 | Saigh et al. | |
| 2015/0269835 A1* | 9/2015 | Benoit | G08B 25/10 340/539.13 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Marcos Torres
(74) *Attorney, Agent, or Firm* — John R. Pivnichny; Law Office of Jim Boice

(57) ABSTRACT

A method, system, and/or computer program product control transmission of assistance requests between electronic devices. One or more processors detect an emergency condition being experienced in real-time by a distressed person. The processor(s) identify at least one assistance candidate that is within a predetermined proximity of the distressed person, and determine a skill level of the at least one assistance candidate for treating the emergency condition. The processor(s) tailor an assistance request on behalf of the distressed person based on the skill level of the at least one assistance candidate, and transmit the assistance request to an electronic device in possession of the at least one assistance candidate.

19 Claims, 5 Drawing Sheets

(56) References Cited

U.S. PATENT DOCUMENTS

| | | |
|---|---|---|
| 2015/0332580 A1 | 11/2015 | Bokhary |
| 2015/0350858 A1 | 12/2015 | Reitnour et al. |
| 2015/0358796 A1 | 12/2015 | Sarna |
| 2016/0071392 A1 | 3/2016 | Hankey et al. |

OTHER PUBLICATIONS

Ritchie et al., "Amber Alerts on Your IPhone: What They Are and How to Manage Them". imore.com, May 16, 2016. Web. Jun. 8, 2016.
Texas A&M University, "Code Maroon Emergency Notification System". Web. Jun. 8, 2016. <codemaroon.tamu.edu>.
Google Play, "Proximity Alert—Android Apps". Web. Apr. 14, 2016. <play.google.com/store/apps/details?id-com.pjd.proximityalert&hl=en>.

* cited by examiner

PROXIMITY ALERT AND PERSONALIZED INSTRUCTIONS RESPONSIVE TO A PHYSICAL DISTRESS

BACKGROUND

The present disclosure relates to the field of communication devices, and specifically to communication devices capable of transmitting and receiving messages. More specifically, the present disclosure relates to personalizing messages related to requests for assistance from a user in physical distress.

SUMMARY

A method, system, and/or computer program product control transmission of assistance requests between electronic devices. One or more processors detect an emergency condition being experienced in real-time by a distressed person. The processor(s) identify at least one assistance candidate that is within a predetermined proximity of the distressed person, and determine a skill level of the at least one assistance candidate for treating the emergency condition. The processor(s) tailor an assistance request on behalf of the distressed person based on the skill level of the at least one assistance candidate, and transmit the assistance request to an electronic device in possession of the at least one assistance candidate.

DETAILED DESCRIPTION

Figure 1:
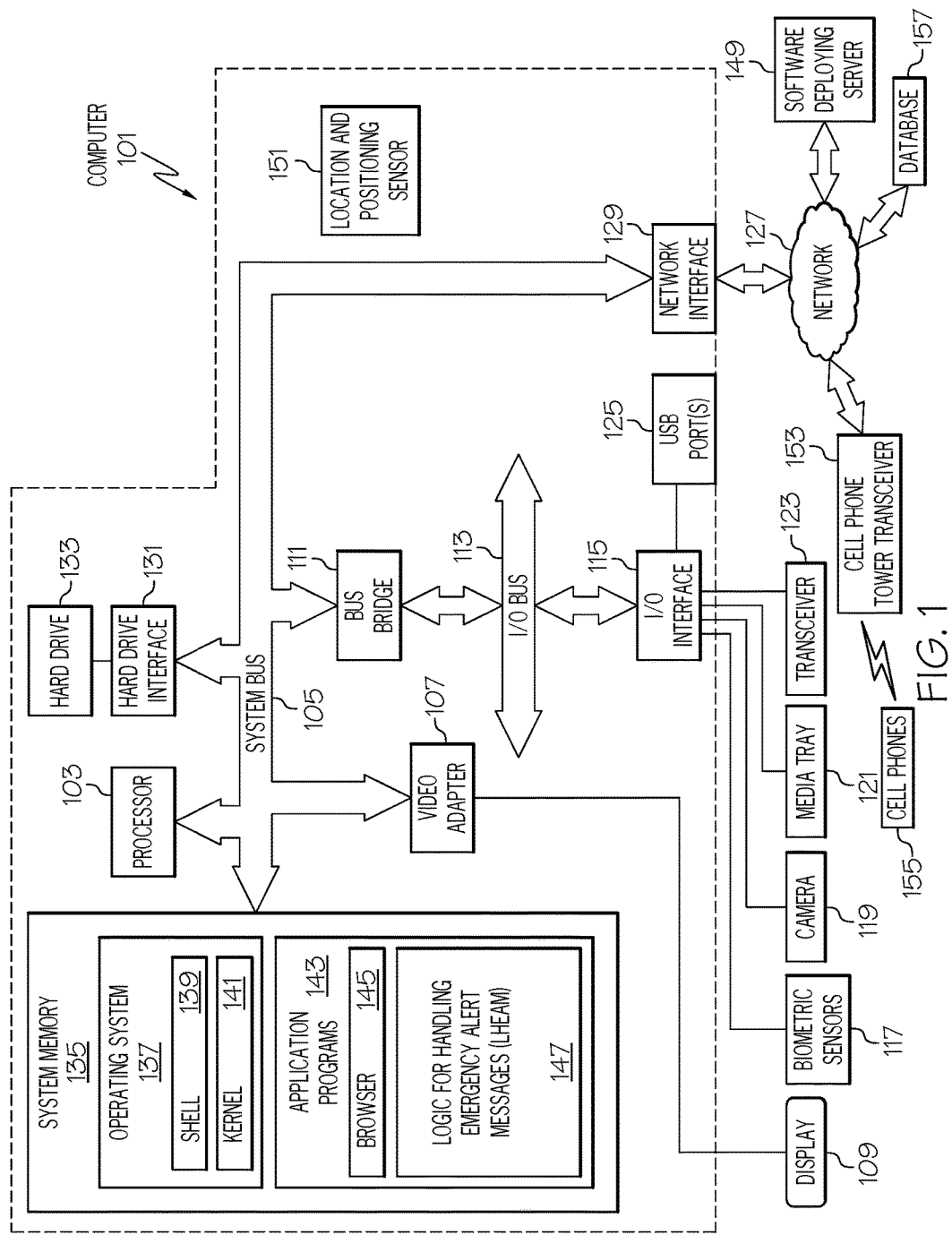
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a method, system, and computer program product that enables a first telecommunication device to transmit a request for physical assistance to one or more other telecommunication devices that are within proximity to the first telecommunication device.

Consider a situation in which a user is severely allergic to a certain food, such as peanuts. As such, this person carries around an emergency epinephrine (adrenaline) injection pen everywhere she goes. However, despite her precautions to avoid peanuts, while at a public park she accidentally eats a snack that has peanuts in it, causing her to go into respiratory distress. In all likelihood, other people around her do not know what is wrong. Even if these people knew what was wrong, they likely would not know that she has an epinephrine injection pen on her person. Furthermore, even if these people knew what was wrong and that there was an epinephrine injection pen readily available, it is highly likely that they would not know how to administer it to the fallen/distressed person.

As such, the present invention causes a telecommunication device used by the distressed person to 1) issue an assistance request to nearby persons to render aid based on the condition of the distressed person, and 2) to transmit instructions, based on the qualifications of the person(s) receiving the assistance request, regarding how to assist the distressed person.

Thus, one or more embodiments of the present invention provide a system and method of detecting and alerting surrounding person(s) of medical/emergency situations and the location of the victim of such medical/emergency situation, in order to enable the surrounding person(s) to provide assistance.

In one or more embodiments of the present invention, a telecommunication device (e.g., a "smart phone" that is able to communicate via a cellular network and also has computing power) allows a distressed person to manually trigger an emergency notification to other persons within a predefined proximity. The telecommunication devices may communicate via a cellular network, or via a short-range network, such as a Wi-Fi network.

In one or more embodiments of the present invention, the request for assistance is automatically generated based on biometric sensor readings from the distressed person, a movement and state of the telecommunication device held by the distressed person, a signal from a biomedical device (e.g., a pacemaker) within the distressed person, etc.

Persons within the predefined proximity are directed to the distressed person using triangulation technology (either locally or globally, as with a global positioning system (GPS) system) to pinpoint the exact location of the user in distress. The system also enables cloud-based resources (i.e., resources available on-demand from a wide area network such as the Internet) to be communicated to those person(s) providing aide according to their level of ability.

As described herein, the disclosed system looks for any persons within close proximity to the distressed person, and then prioritizes them according to their current physical distance from the distressed person, their ability level for handling the condition being experienced by the distressed person, their willingness to help the distressed person, and/or their current state.

In one or more embodiments, nearby persons have pre-registered their preferences for helping into a database on the wide area network. For example, certain persons may only be willing to help family members (opting in), while others who have ophidiophobia may be uncomfortable assisting victims of a snake bite (opting out). Based on such preferences, these persons will receive an alert of who is in distress and along with information such as (but not limited to), the name of the distressed person, a photo of the distressed person, instructions on how to access the distressed person (e.g., how to unlock a door to a building in which the distressed person is located), any pre-existing medical conditions of the distressed person, as well as personalized instructions (including video instructions) on how to assist the distressed person according to the condition of the distressed person and the abilities of the assisting person.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or cell phone tower transceiver 153 shown in FIG. 1, and/or the phones 204a-204c shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including biometric sensors 117 (e.g., biometric sensors capable of detecting body heat, respiratory levels, skin resistance, vocalizations such as cries or moans indicative of an injured person, etc.), a camera 119 (capable of digitally capturing and/or storing still and moving video images), a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Handling Emergency Alert Messages (LHEAM) 147. LHEAM 147 includes code for implementing the processes described below, including those described in FIGS. 2-3. In one embodiment, computer 101 is able to download LHEAM 147 from software deploying server 149, including in an on-demand basis, wherein the code in LHEAM 147 is not downloaded until needed for execution. In one embodiment of the present invention, software deploying server 149 performs all of the functions associated with the present invention (including execution of LHEAM 147), thus freeing computer 101 from having to use its own internal computing resources to execute LHEAM 147.

Also within computer 101 is a location and positioning sensor 151, which is able to detect the physical location of computer 101 and/or the orientation of computer 101. For example, location and positioning sensor 151 may incorporate global positioning system (GPS) sensors that identify the geophysical location of computer using signals from an array of space-based GPS satellites. Furthermore, location and positioning sensor 151 may the distance and angular orientation between any two electronic transceivers (e.g., by detecting Doppler shifts, signal bounce-back timing, etc.) to detect the location and distance from one electronic device to another electronic device. In addition, location and positioning sensor 151 may include accelerometers, gravity sensors, and other positioning sensors that detect a 3-D (X, Y, Z, axis) orientation of computer 101 in real time, as well as any sudden acceleration (fall) or deceleration (stop) experienced by computer 101.

Computer 101 is also able to communicate with a cell phone tower transceiver 153, which communicates with cell phone 155 that are within the "cell" services by cell phone tower transceiver 153 using any cellular network protocol.

Computer 101 is also able to access resources (including cloud-based resources), such as database 157, which may contain profile information about distressed persons, candidate assistants, etc. that are described herein. This profile information includes, but is not limited to, medical histories of the distressed persons, academic and work history of candidate assistants, etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
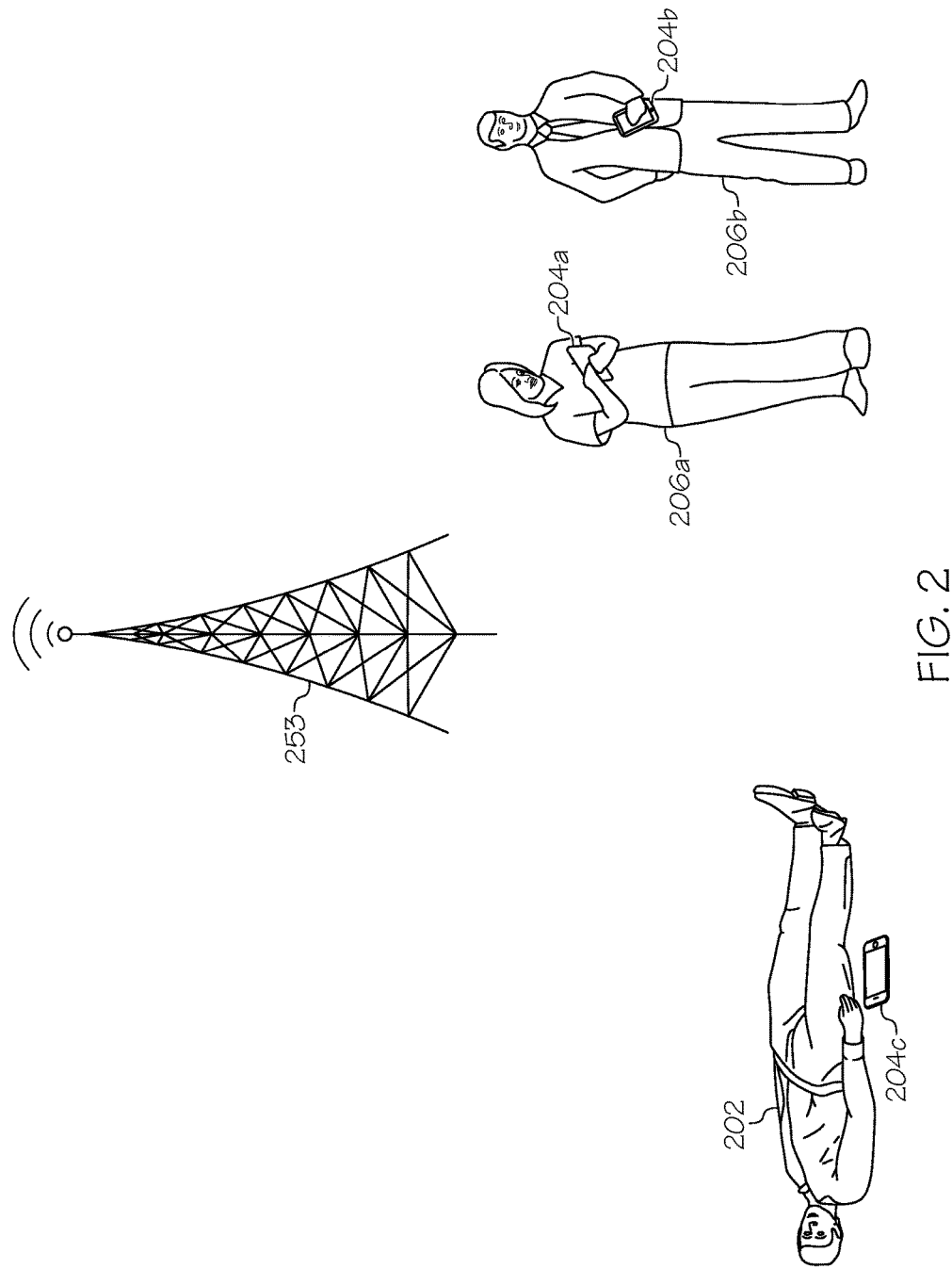
FIG. 2 illustrates a cell of telecommunication devices as utilized in one or more embodiments of the present invention.

With reference now to FIG. 2, assume that cell phone tower 253 is providing cell phone service to a telecommunication cell. Assume further that there is a distressed person 202, who has suffered some type of medical emergency (e.g., is highly allergic to bees and has been stung; has had a heart attack; has fallen and suffered a broken bone and/or concussive brain injury; etc.). Assume further that distressed person 202 is carrying phone 204c (i.e., a "smart phone"), which is able to communicate text, voice, and video messages to phone 204a (carried by assistance candidate 206a) and/or to phone 204b (carried by assistance candidate 206b) as well as perform computing functions described herein. Assistance candidates 204a-204b are persons whom the system identifies as potential candidates for rendering aid to distressed person 202 as described herein. (While only two assistance candidates 204a-204b are depicted in FIG. 2, it is understood that many more assistance candidates may be available and/or considered for receiving an assistance request on behalf of the distressed person 202.)

For illustrative purposes, assume that distressed person 202 has suffered a severe allergic reaction from a bee sting, and is carrying an emergency epinephrine injection pen on her person. Computer 101 shown in FIG. 1, which is in communication with phone 204a-204c via transceivers within cell phone tower 253, is able to (1) determine what problem is being experienced by distressed person 202; (2) determine the locations of assistance candidate 206a and assistance candidate 206b relative to distressed person 202; (3) determine the skill profiles of assistance candidate 206a and assistance candidate 206b; (4) determine the current state of assistance candidate 206a and assistance candidate 206b; (5) select which assistance candidate from assistance candidate 206a and assistance candidate 206b is to receive an assistance request for distressed person; (6) generate and transmit tailored assistance request instructions to the assistance candidate 206a and/or assistance candidate 206b for aiding the distressed person; (7) monitor the condition of distressed person 202 and/or the state of care being provided by assistance candidate 206a and/or assistance candidate 206b; and/or (8) automatically send a call to an emergency health care provider (e.g., an ambulance service) to provide further care to distressed person 202.

With regard to ability of computer 101 to (1) determine what problem is being experienced by distressed person 202, computer 101 is able to receive sensor outputs from sensors on distressed person 202 and/or phone 204c.

For example, assume that distressed person 202 is wearing a heart monitor that has a near-field communication connection to phone 204c. Assume further that this heart monitor produces sensor outputs indicative of distressed person 202 having a cardiac episode (e.g., tachycardia that is induced by anaphylaxis from the bee sting). Thus, these sensor outputs describe the physiological state of distressed person 202.

Similarly, the physiological state of distressed person 202 may be detected by biometric sensors worn by distressed person 202 and/or integrated into phone 204c (e.g., biometric sensors 117 shown in FIG. 1 and incorporated into phone 204c), such as skin galvanometers (to indicate sweating), respiratory monitors, etc. whose outputs directly detect the physiological state of distressed person 202.

In one embodiment, the physiological state of distressed person 202 is inferred by system sensors within phone 204c. For example, assume that the location and positioning sensor 151 (depicted in FIG. 1 and part of phone 204c) detects a rapid drop to the ground. This detection alone may be indicative of nothing more that phone 204c being accidentally dropped. However, if the detection of phone 204c falling occurs along with a continuous detection of body heat (e.g., using integral biometric sensors 117 shown in FIG. 1 and incorporated into phone 204c) from distressed person 202, than an assumption is made that distressed person 202 has fallen. If the location and positioning sensor 151 (depicted in FIG. 1 and incorporated into phone 204c) detects no movement for a predetermined amount of time (e.g., 30 seconds), then the system assumes that distressed person 202 is injured.

Likewise, if the location and positioning sensor 151 integrated into phone 204c detects that phone 204c has free-fallen (e.g., over a cliff) for a long distance (e.g., 50 feet) while continuing to detect (e.g., using biometric sensors 117 that are integrated into phone 204c) body heat indicating that distressed person 202 was holding phone 204c during this free-fall, then the system will assume that distressed person suffered traumatic injury from the free-fall.

With further reference to computer 101's ability to (1) determine what problem is being experienced by distressed person 202, in an embodiment of the present invention computer 101 is able to access a database (e.g., database 157 shown in FIG. 1) that describes a medical history of distressed person 202. Therefore, if phone 204c falls suddenly to the ground while being held by distressed person 202 (as described above), the distressed person 202 has a medical history of a severe allergy to bee stings, and bees are know to populate a present area in which distressed is located, then computer 101 will assume that it is likely that distressed person 202 is having an adverse reaction to a bee sting.

With regard to the ability of computer 101 to (2) determine the locations of assistance candidate 206a and assistance candidate 206b relative to distressed person 202, location and positioning sensors 151 integrated into phones 204a-204c are able to determine their relative positions. For example, the location and positioning sensors 151 within each of the phones 204a-204c may be global positioning system (GPS) enabled. As such, GPS coordinates can be shared amongst phone 204a-204c, thereby allowing computer 101 and/or phones 204a-204c themselves to determine where they are located in real time, particularly in relation to one another.

Alternatively, phones 204a-204c can exchange electromagnetic signals directly amongst themselves using transceiver 123 (depicted in FIG. 1 and incorporated into each of the phones 204a-204c). Using a combination of Doppler shifts, signal strengths, phase-array antennae, etc., each of the phones 204a-204c are able to determine the relative location of other phones from phones 204a-204c.

This relative positioning information is thus able to identify which of assistance candidate 206a and assistance candidate 206b is physically closest to distressed person 202 in real time, and thus can get to distressed person 202 faster, assuming that assistance candidate 206a and assistance candidate 206b both have equal mobility skills and means.

However, the relative position information may be temporal (i.e., based on how long it would take assistance candidate 206a and/or assistance candidate 206b to reach the distressed person 202). For example, if assistance candidate 206a is a pedestrian and assistance candidate 206b is driving his car, then assistance candidate 206b may be able to get to distressed person 202 quicker than assistance candidate 206a. (Making the determination as to whether assistance candidate 206a and/or assistance candidate 206b are on foot, public transportation, a personal vehicle, etc. may be made based on a transportation status entered into phones 204a/204b, GPS signals from phones 204a/204b may be indicative of a person walking (e.g., less than 4 miles per hour), taking public transportation (e.g., stopping at every intersection); or driving a personal vehicle (e.g., moving in and out of traffic).)

However, even if assistance candidate 206a is a pedestrian and assistance candidate 206b is driving his car, assistance candidate 206a may be able to get to the distressed person 202 faster than assistance candidate 206b due to traffic condition, vehicle barricades, etc., which may be identified by a real-time traffic monitoring system accessible to the computer 101 that is monitoring real-time conditions and implementing the present invention.

Thus, the system (e.g. computer 101 shown in FIG. 1) is able to determine the spatial distance between assistance candidates 206a/206b and the distressed person 202 (i.e., how far apart they are physically), and/or the temporal distance between assistance candidates 206a/206b and the distressed person 202 (i.e., how long it will take for assistance candidates 206a/206b to reach distressed person 202).

With regard to the ability of computer 101 to (3) determine the skill profiles of assistance candidate 206a and assistance candidate 206b, assume that computer 101 contains (e.g., within hard drive 133 and/or system memory 135) or has access to (e.g., via cloud resource databases such as database 157 available via network 127) skill profile information about the users of phones 202a-202b. For example, such skill profile information may describe the education and experience in treating bee sting victims for assistance candidate 206a and assistance candidate 206b. Assume then that profiles in an accessible database reveal that assistance candidate 206a is a health care provider who specializes in emergency medical procedures (e.g., is an emergency department health care worker), while assistance candidate 206b is a structural engineer (with no medical training). If distressed person 202 was trapped under a collapsed building, then assistance candidate 206b would be better suited that assistance candidate 206a to help distressed person 202. However, since distressed person 202 is probably having an allergic reaction to a bee sting (as indicated by biometric sensors associated with phone 204c, the medical profile of distressed person 202, etc.), then assistance candidate 206a is a better candidate for assisting distressed person 202.

Continuing with the example in which distressed person 202 is having an adverse reaction to a bee sting and assistance candidate 206a has been determined to be the best suited assistance provider within a predetermined distance (spatial or temporal) of distressed person 202, the system (e.g., computer 101) will then determine the current state of assistance candidate 206a and assistance candidate 206b.

Thus, with regard to the ability of computer 101 to (4) determine the current state of assistance candidate 206a and assistance candidate 206b, assume that phones 204a/204b contain biometric and/or physical sensors. For example, assume that phone 204a has a heart monitor (e.g., one of the biometric sensors 117 shown in FIG. 1) that monitors the heart rate of assistance candidate 206a, and phone 204b has an accelerometer and/or positioning system (e.g., using location and positioning sensor 151) that detects movement of assistance candidate 206b. If biometric sensors within phone 204a are detecting that assistance candidate 206a is taking a nap (e.g., as indicated by a slow steady heart rate), then assistance candidate 206a is a poor candidate for requesting assistance on behalf of distressed person 202. Similarly, if positioning sensors within phone 204b are detecting that assistance candidate 206b is jogging (and thus is likely to be very tired or else is not monitoring phone 204b), then assistance candidate 206b is a poor candidate for requesting assistance on behalf of distressed person 202.

With regard to the ability of computer 101 to (5) select which assistance candidate from assistance candidate 206a and assistance candidate 206b is to receive an assistance request for distressed person, this decision is based on (1) what problem is being experienced by distressed person 202; (2) the determined locations of assistance candidate 206a and assistance candidate 206b relative to distressed person 202; (3) the determined skill profiles of assistance candidate 206a and assistance candidate 206b; and/or (4) the determined current state of assistance candidate 206a and assistance candidate 206b. Thus, the system (phone 204c and/or computer 101) decides to send an assistance request message (e.g., from phone 204c) to phone 204a and/or phone 204b based on one or more of these factors, as determined above.

For example, assume that distressed person 202 has been stung by a bee, assistance candidate 206a is a health care provider who is within 50 feet of distressed person 202 and is in a favorable (e.g., relaxed and alert) state for providing assistance to distressed person 202. Assume further that assistance candidate 206b is a construction worker (with no medical background) who is 2 miles from distressed person 202 and is exhausted from jogging. As such, assistance candidate 206a is an excellent candidate for helping distressed person 202, while assistance candidate 206b is a poor candidate for helping distressed person 202.

In one or more embodiments, these factors (for determining which assistance candidate from assistance candidate 206a and assistance candidate 206b receives the assistance requests) may be weighted. For example, if distressed person 202 is having an adverse reaction to a bee sting, assistance candidate 206a is a health care provider but is two miles away from distressed person 202, and assistance candidate 206b is a construction worker who is only 50 feet away from distressed person 202, then the assistance request will be sent to the construction worker as well, since his timely assistance will nonetheless be deemed useful to distressed person 202.

With regard to the ability of computer 101 to (6) generate and transmit tailored assistance request instructions to the assistance candidate 206a and/or assistance candidate 206b for aiding the distressed person, assume that the system (computer 101 and/or phone 204c) has decided to send assistance requests to both phone 204a and phone 204b. Assume further that the system has determined that assistance candidate 206a is experienced with the use of an epinephrine injection pen (either from personal user or professional use), while assistance candidate 206b has never seen such a device. As such, the system will transmit simple instructions to phone 204a, such as the location of distressed person 202, a photo of distressed person 202, a photo of an area (e.g., captured be camera 119 that is incorporated into phone 204c), and/or a location on the person of distressed person 202 in which she keeps her epinephrine injection pen (e.g., in her purse, her pocket, etc.).

Continue to assume that assistance candidate 206b has limited experience with (or has never seen) an epinephrine injection pen. As such, the system will not only transmit the location of distressed person 202, the photo of distressed person 202, the photo of an area, and/or the location on the person of distressed person 202 in which she keeps her epinephrine injection pen, but also detailed instructions (as text and/or a video) explaining how to use the epinephrine injection pen on distressed person 202 (assuming that she is incapacitated when assistance candidate 206b reaches her).

Furthermore, if assistance candidate 206a and/or assistance candidate 206b are detected as having certain states (e.g., experiencing panic or fatigue), then simple and clear directions on how to use the epinephrine injection pen may be sent to the phones 202a/202b, regardless of the skill level of assistance candidate 206a and/or assistance candidate 206b in using the epinephrine injection pen.

Thus, the assistance request is tailored to the ability and/or state of the assistance candidate.

In another example, assume that distressed person 202 is asleep in her own bed and starts having a heart attack, as detected by the biometric sensors that are monitoring the distressed person 202. The system (e.g., computer 101) receives an indication of the heart attack from phone 204c, and alerts a family member or friend or neighbor of the event (e.g., in a message to a phone 204a), in order for that person (assistance candidate 206a) to come to the location of the distressed person 202 and provide assistance. Depending on the level of skill in administering care (e.g., cardiopulmonary resuscitation—CPR) to the distressed person 202 that a particular person (e.g., assistance candidate 206a) has, a CPR instructions and/or CPR video is rendered as part of the alert, thereby assisting the assistance candidate 206a in rendering aid. As described herein, the level of instruction (rudimentary to advanced) chosen to be transmitted to the assistance candidate 206a is in accordance with the skill level of the assistance candidate 206a in administering CPR.

Furthermore, in one or more embodiments of the present invention, the instructions being delivered to the user who is helping (e.g., assistance candidate 206a) changes based on the condition and vital signs of the user in distress. For, if the computer 101 detects biometric readings for distressed person 202 indicating that distressed person 202 is now having a seizure, then a new set of instructions and/or video are sent to phone 204a in order to aid assistance candidate 206a when providing first aid to the distressed person 202.

In one or more embodiments of the present invention, the request for assistance being sent from phone 204c to phone 204a and/or phone 204b shown in FIG. 2 also include data about the surroundings of the distressed person 202, such as ambient temperature, type of location, noises, etc. to help the assistance candidate in finding and treating the distressed person 202.

In one or more embodiments of the present invention, the request for assistance being sent from phone 204c to phone 204a and/or phone 204b shown in FIG. 2 also include data about surroundings of the distressed person 202 that could affect the safety of the assistance candidate as he/she approaches the distressed person 202. For example, if the distressed person 202 is lying in a cloud of toxic gas (e.g., as detected by a sensor on the phone 204c), this information is conveyed to the assistance candidate who is receiving the assistance request, in order to give them advanced warning of the danger (and thus be able to don protective equipment, etc.).

In one or more embodiments of the present invention, phone 204c not only issues a telecommunication message to phone 204a and/or phone 204b shown in FIG. 2, but also contemporaneously issues a visual and/or audible signal, thus providing a visual and/or aural indication to the responding assistance candidate, thereby providing additional assistance in locating the position of the distressed person 202.

With regard to the ability of computer 101 to (7) monitor the condition of distressed person 202 and/or the state of care being provided by assistance candidate 206a and/or assistance candidate 206b, the system (computer 101 and/or phone 204c) continuously monitors the medical condition of distressed person 202. If there is a change to that medical condition, then 1) a different assistance request is sent out, perhaps to a different assistance candidate. For example, if the original assistance request was sent to phone 204a based on the distressed person 202 having a bee sting (for which assistance candidate 206a has expertise), but distressed person 202 then goes into an unrelated seizure (for which assistance candidate 206b has expertise but for which assistance candidate 206a has no expertise), then a new assistance request and/or instruction set is sent to phone 204b.

In one or more embodiments of the present invention, alerts (e.g., follow-ups to the assistance request broadcast earlier) are continuously updated to provide a current medical health status of distressed person 202 (e.g., until distressed person 202 is deemed stable according to biomedical sensor readings from phone 204c).

With regard to the ability of computer 101 to (8) automatically send a call to an emergency health care provider (e.g., an ambulance service) to provide further care to distressed person 202, in one or more embodiments of the present invention computer 101 and/or phone 204c will contemporaneously send an emergency phone call to an emergency health care provider (e.g., by calling "911" for an ambulance). Thus, professional help will be on the way to the distressed person 202 while first aid is being rendered by assistance candidate 206a and/or assistance candidate 206b.

In one or more embodiments of the present invention, update notifications are sent from computer 101 (based on updates received from an emergency services dispatcher) to phone 204a and/or phone 204b and/or phone 204c regarding how far away emergency assistance (e.g., an ambulance) is and its expected arrival time at the location of the distressed person 202. Such information may also be sent to emergency call centers (e.g., an emergency department at a local hospital), thus advising them of the situation with the distressed person 202. Furthermore, such information may be automatically sent to persons/contacts previously designated by the distressed person 202 (e.g., friends, family, etc.), thus alerting such persons/contacts to let them know of the emergency regarding the distressed person 202.

Figure 3:
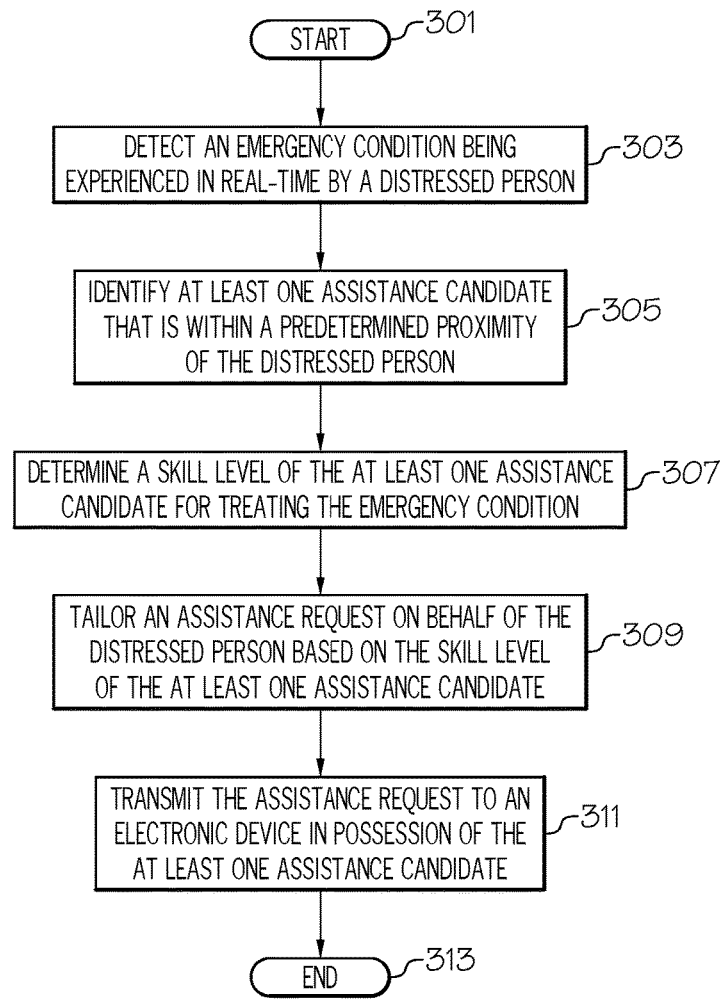
FIG. 3 is a high-level flow chart of one or more steps performed by one or more processors to activate a physical assistance request via a telecommunication network in accordance with one or more embodiments of the present invention.

With reference now to FIG. 3, a high-level flow chart of one or more steps performed by one or more processors and/or other hardware devices to selectively transmit personalized instructions to an electronic device such as a cell phone in accordance with one or more embodiments of the present invention is presented.

After initiator block 301, one or more processors (e.g., processor 103 shown in FIG. 1 within computer 101 and/or phone 204c) detect an emergency condition being experienced in real-time by a distressed person (e.g., distressed person 202 shown in FIG. 2), as described in block 303.

As described in block 305, one or more processors then identify at least one assistance candidate (e.g., assistance candidate 206a and/or assistance candidate 206b shown in FIG. 2) that is within a predetermined proximity (e.g., within a telecommunications cell services by cell phone tower 253, within a predefined temporal/spatial proximity, etc.) of the distressed person.

As described in block 307, one or more processors determine a skill level of the at least one assistance candidate for treating the emergency condition, as described herein.

As described in block 309, one or more processors tailor an assistance request on behalf of the distressed person based on the skill level of the at least one assistance candidate, as also described herein.

As described in block 311, one or more processors transmit the assistance request to an electronic device (e.g., phone 204a and/or phone 204b shown in FIG. 2) that is in possession of the at least one assistance candidate.

The flow-chart ends at terminator block 313.

In an embodiment of the present invention, one or more processors receive biometric sensor readings from a biometric sensor (e.g., one or more of the biometric sensors 117 within phone 204c) on the distressed person, and identify the emergency condition based on the received biometric sensor readings.

In an embodiment of the present invention, one or more processors determine a current cognitive state (e.g., alert, calm, fatigued panicked, etc.) of the at least one assistance candidate, and then further tailor the assistance request based on the current cognitive state of the at least one assistance candidate.

Furthermore and in an embodiment of the present invention, one or more processors receive biometric sensor readings from a biometric sensor on the at least one assistance candidate, and then selectively send the assistance request based on the received biometric sensor readings for the at least one assistance candidate. This "selective sending" may include blocking the message. That is, if the system determines that a particular assistance candidate from assistance candidates 206a/206b is not currently capable of rendering aid to the distressed person 202, then the assistance request will be blocked from being sent to phone 204a and/or phone 204b.

As described herein and in one or more embodiments of the present invention, the predetermined proximity between the distressed person and the assistance candidate is a physical distance between the at least one assistance candidate and the distressed person.

As described herein and in one or more embodiments of the present invention, the predetermined proximity between the distressed person and the assistance candidate is a temporal distance that describes an amount of time required for the at least one assistance candidate to reach the distressed person.

As described herein and in one or more embodiments of the present invention, emergency condition being suffered by the distressed person is a medical emergency.

As described herein, the present invention provides the ability to decrease the response time needed to assist victims who are having physical problems or are having any other type of emergency (e.g., being trapped, exposed to fire, etc.) by alerting the nearest potential assistance providers, as well as providing the assistance providers with information about the health condition and/or recommend treatment of the distressed person based on the vital signs of the distressed person.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
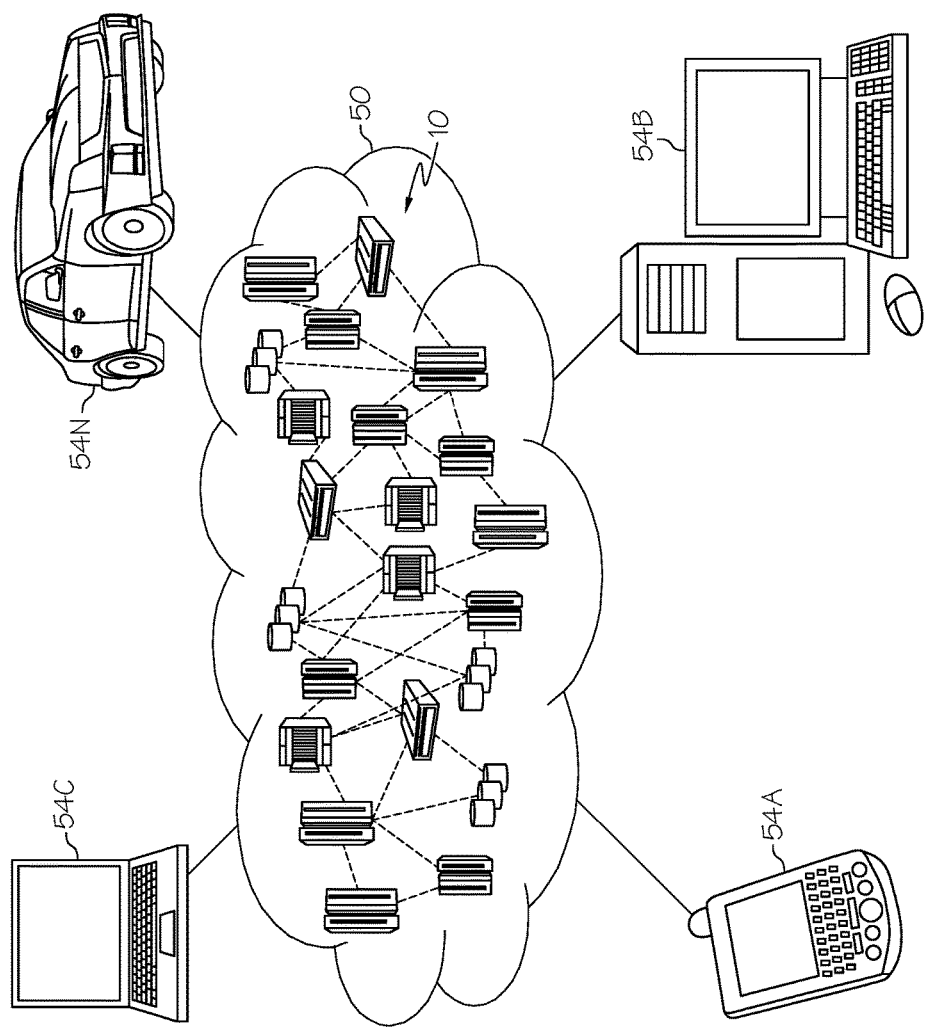
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
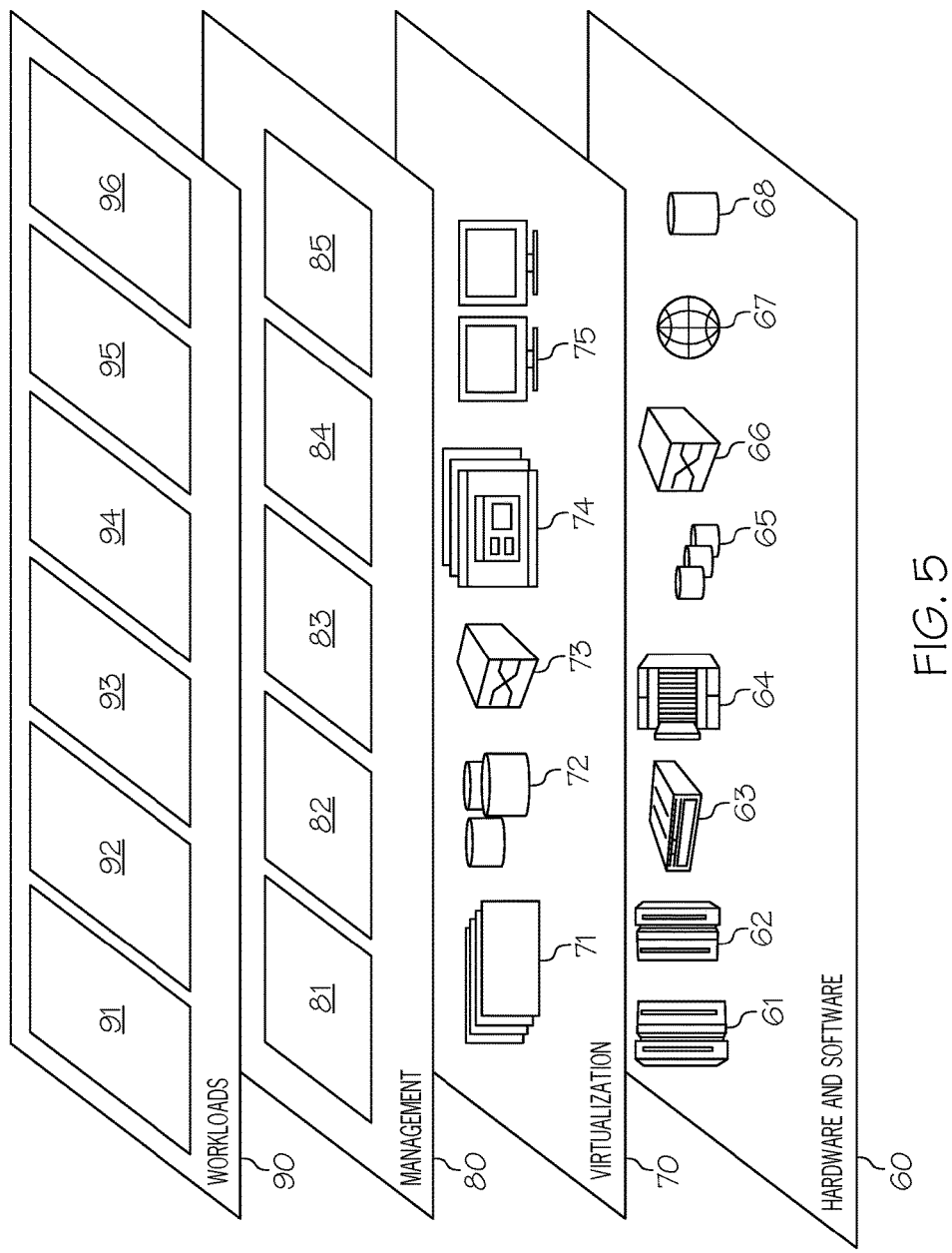
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and telecommunication message processing 96, which performs one or more functions described for the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:
1. A method comprising:
  detecting, by one or more processors, an emergency condition being experienced in real-time by a distressed person;
  receiving, by one or more processors, a first signal from a cell phone indicating that the cell phone has free-fallen more than a predefined distance, wherein the cell phone is in a possession of the distressed person, and wherein the first signal is generated by an accelerometer in the cell phone;

receiving, by one or more processors, a second signal from the cell phone indicating that the distressed person is holding the cell phone while the cell phone is free-falling more than the predefined distance, wherein the second signal is generated by a biometric sensor in the cell phone;

determining, by one or more processors and based on the first signal and the second signal, that the emergency condition is a result of the distressed person free-falling more than the predefined distance;

identifying, by one or more processors, at least one assistance candidate that is within a predetermined proximity of the distressed person;

determining, by one or more processors, a skill level of the at least one assistance candidate for treating the emergency condition;

tailoring, by one or more processors, instructions in an assistance request to the at least one assistance candidate on behalf of the distressed person based on the skill level of the at least one assistance candidate, wherein the instructions describe steps to be taken to ameliorate the emergency condition being experienced by the distressed person;

transmitting, by one or more processors, the assistance request to an electronic device in possession of the at least one assistance candidate;

determining, by one or more processors, that the skill level of the at least one assistance candidate is below a predetermined level for operating a device that ameliorates the emergency condition; and in response to determining that the skill level of the at least one assistance candidate is below the predetermined level for operating the device that ameliorates the emergency condition, transmitting, by one or more processors, a video message that illustrates steps to be taken to operate the device to a cell phone that is in possession of the at least one assistance candidate.

2. The method of claim 1, further comprising:
receiving, by one or more processors, biometric sensor readings from a biometric sensor on the distressed person; and
identifying, by one or more processors, the emergency condition based on the received biometric sensor readings.

3. The method of claim 1, further comprising:
determining, by one or more processors, a current emotional state of the at least one assistance candidate; and
further tailoring, by one or more processors, the instructions in the assistance request based on the current emotional state of the at least one assistance candidate.

4. The method of claim 1, further comprising:
receiving, by one or more processors, biometric sensor readings from a biometric sensor on the at least one assistance candidate; and
selectively sending, by one or more processors, the assistance request based on the received biometric sensor readings for the at least one assistance candidate.

5. The method of claim 1, wherein the predetermined proximity is a physical distance between the at least one assistance candidate and the distressed person.

6. The method of claim 1, further comprising:
detecting, by one or more processors, an environmental hazard found in an environment of the distressed person;
determining, by one or more processors, that a first assistance candidate is susceptible to the environmental hazard and that a second assistance candidate is not susceptible to the environmental hazard; and
transmitting, by one or more processors, the assistance request to the second assistance candidate and not to the first assistance candidate.

7. A computer program product comprising one or more computer readable storage mediums, and program instructions stored on at least one of the one or more storage mediums, the stored program instructions comprising:
program instructions to detect an emergency condition being experienced in real-time by a distressed person;
program instructions to receive a first signal from a cell phone indicating that the cell phone has free-fallen more than a predefined distance, wherein the cell phone is in a possession of the distressed person, and wherein the first signal is generated by an accelerometer in the cell phone;
program instructions to receive a second signal from the cell phone indicating that the distressed person is holding the cell phone while the cell phone is free-falling more than the predefined distance, wherein the second signal is generated by a biometric sensor in the cell phone;
program instructions to determine, based on the first signal and the second signal, that the emergency condition is a result of the distressed person free-falling more than the predefined distance;
program instructions to identify at least one assistance candidate that is within a predetermined proximity of the distressed person;
program instructions to determine a skill level of the at least one assistance candidate for treating the emergency condition;
program instructions to tailor instructions in an assistance request to the at least one assistance candidate on behalf of the distressed person based on the skill level of the at least one assistance candidate, wherein the instructions describe steps to be taken to ameliorate the emergency condition being experienced by the distressed person;
program instructions to transmit the assistance request to an electronic device in possession of the at least one assistance candidate;
program instructions to determine that the skill level of the at least one assistance candidate is below a predetermined level for operating a device that ameliorates the emergency condition; and
program instructions to, in response to determining that the skill level of the at least one assistance candidate is below the predetermined level for operating the device that ameliorates the emergency condition, transmit a video message that illustrates steps to be taken to operate the device to a cell phone that is in possession of the at least one assistance candidate.

8. The computer program product of claim 7, further comprising:
program instructions to receive biometric sensor readings from a biometric sensor on the distressed person; and
program instructions to identify the emergency condition based on the received biometric sensor readings.

9. The computer program product of claim 7, further comprising:
program instructions to determine a current emotional state of the at least one assistance candidate; and
program instructions to further tailor the instructions in the assistance request based on the current emotional state of the at least one assistance candidate.

10. The computer program product of claim 7, further comprising:
 program instructions to receive biometric sensor readings from a biometric sensor on the at least one assistance candidate; and
 program instructions to selectively send the assistance request based on the received biometric sensor readings for the at least one assistance candidate.

11. The computer program product of claim 7, wherein the predetermined proximity is a physical distance between the at least one assistance candidate and the distressed person.

12. The computer program product of claim 7, wherein the predetermined proximity is a temporal distance that describes an amount of time required for the at least one assistance candidate to reach the distressed person.

13. The computer program product of claim 7, wherein the emergency condition is a medical emergency.

14. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
 program instructions to detect an emergency condition being experienced in real-time by a distressed person;
 program instructions to receive a first signal from a cell phone indicating that the cell phone has free-fallen more than a predefined distance, wherein the cell phone is in a possession of the distressed person, and wherein the first signal is generated by an accelerometer in the cell phone;
 program instructions to receive a second signal from the cell phone indicating that the distressed person is holding the cell phone while the cell phone is free-falling more than the predefined distance, wherein the second signal is generated by a biometric sensor in the cell phone;
 program instructions to determine, based on the first signal and the second signal, that the emergency condition is a result of the distressed person free-falling more than the predefined distance;
 program instructions to identify at least one assistance candidate that is within a predetermined proximity of the distressed person;
 program instructions to determine a skill level of the at least one assistance candidate for treating the emergency condition;
 program instructions to tailor instructions in an assistance request to the at least one assistance candidate on behalf of the distressed person based on the skill level of the at least one assistance candidate, wherein the instructions describe steps to be taken to ameliorate the emergency condition being experienced by the distressed person;
 program instructions to transmit the assistance request to an electronic device in possession of the at least one assistance candidate;
 program instructions to determine that the skill level of the at least one assistance candidate is below a predetermined level for operating a device that ameliorates the emergency condition; and
 program instructions to, in response to determining that the skill level of the at least one assistance candidate is below the predetermined level for operating the device that ameliorates the emergency condition, transmit a video message that illustrates steps to be taken to operate the device to a cell phone that is in possession of the at least one assistance candidate.

15. The computer system of claim 14, further comprising:
 program instructions to receive biometric sensor readings from a biometric sensor on the distressed person; and
 program instructions to identify the emergency condition based on the received biometric sensor readings.

16. The computer system of claim 14, further comprising:
 program instructions to determine a current emotional state of the at least one assistance candidate;
 program instructions to further tailor the instructions in the assistance request based on the current emotional state of the at least one assistance candidate.

17. The computer system of claim 14, further comprising:
 program instructions to receive biometric sensor readings from a biometric sensor on the at least one assistance candidate; and
 program instructions to selectively send the assistance request based on the received biometric sensor readings for the at least one assistance candidate.

18. The computer system of claim 14, wherein the predetermined proximity is a temporal distance that describes an amount of time required for the at least one assistance candidate to reach the distressed person.

19. The computer system of claim 14, wherein the emergency condition is a medical emergency.

\* \* \* \* \*